Oct. 4, 1927.

E. W. UTZLER 1,644,554

NUT LOCK

Filed July 5, 1924

INVENTOR
Oliver W. Utzler
by O. M. Clarke
attorney

Patented Oct. 4, 1927.

1,644,554

UNITED STATES PATENT OFFICE.

ELMER W. UTZLER, OF CORLISS STATION, PENNSYLVANIA.

NUT LOCK.

Application filed July 5, 1924. Serial No. 724,189.

My invention consists of an improvement in locking devices for nuts and bolts. It has for its object to provide such a device which may be utilized with a standard bolt and nut by a slight change in the nut and the addition of a special distorting member.

The invention utilizes such member in the manner hereinafter described through a novel principle and with a resulting holding effect and efficiency which cumulates to a maximum as the nut is screwed tight.

In the drawings, illustrating one preferred embodiment of the invention:

Figure 1:
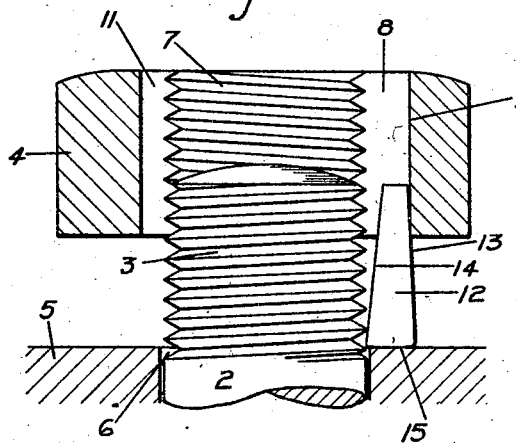
Fig. 1 is a sectional view showing a nut and bolt with the distorting member in position for application.
Figure 3:
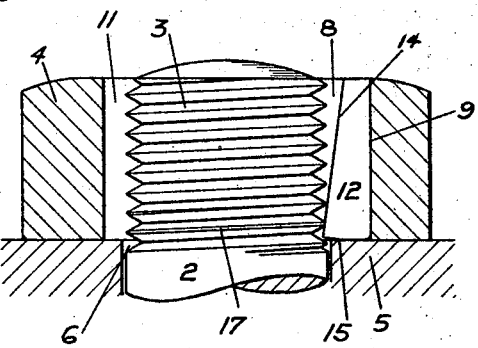
Fig. 3 is a view similar to Fig. 1, showing the nut screwed down tight.
Figure 2:
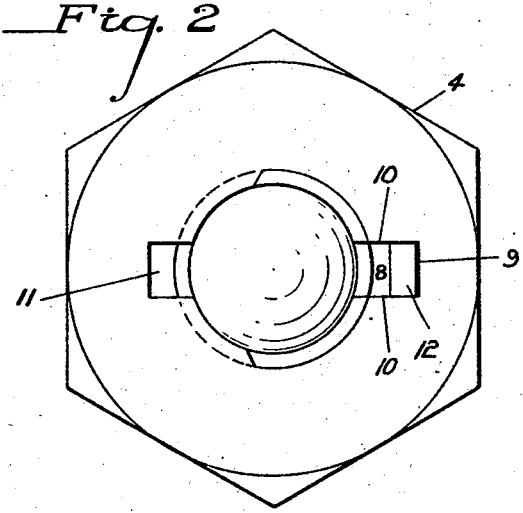
Fig. 2 is a plan view of Fig. 1.

In the drawings, 2 represents an ordinary standard bolt having the usual threaded portion 3 for application of the usual standard nut 4 to exert tightening or binding pressure against the member 5 through which the bolt 2 extends by hole 6. The threaded portion 3 may be either straight or tapered, and preferably of V-form in cross section, with corresponding threads 7 in nut 4. The nut 4 is provided at one side with a slot 8 extending through from top to bottom parallel with its longitudinal center and having a rear similarly parallel flat wall 9 and opposite end walls 10—10, providing a generally rectangular cavity extending inwardly from the threads 7, as shown.

At the opposite side of the bolt hole of the nut, or at any other convenient position, is a similar cavity 11, the walls of which may be like those of cavity 8 or of any other desired shape. Cavity 11, being for the purpose of collection and escape of cuttings, is merely a clearance opening and its shape in cross section is not essential, provided sufficient clearance space is presented.

The active element of the invention is the distorting member 12 consisting of a key or lever preferably rectangular in cross section, adapted to freely fit within cavity 8, and provided with opposite tapered faces 13 and 14 respectively, in the manner of a wedge. While such member resembles a wedge in shape, its action, however, is more in the nature of a lever, as hereinafter described, and, while a tapered form as shown is effective and convenient, the important feature of such member 12 is that its wider or bottom end 15 shall exceed slightly the space between the outer periphery of threads 3 and the inner face 9 of socket 8, in order to effect the desired function. Also, that its thread contacting face 14 shall be smooth or plane.

Figure 4:
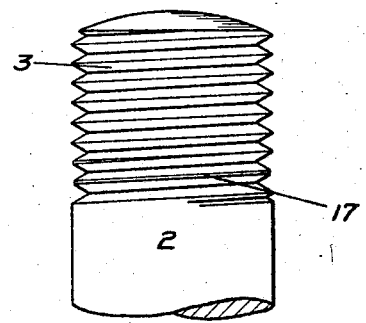
Fig. 4 is a view of the threaded end of the bolt, illustrating the condition of the threads after application.
Figure 5:
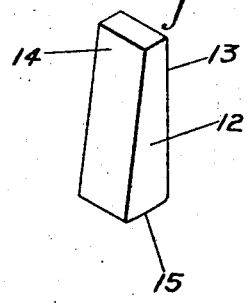
Fig. 5 is a perspective detail view of the distorting member before use.
Figure 6:
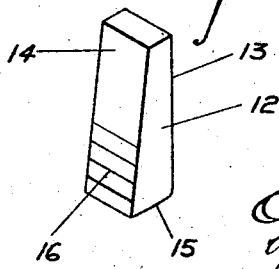
Fig. 6 is a similar view, showing such member after use.

As shown in Fig. 1, member 12 is loosely in position, with its wide base resting on the surface of member 5 and its smaller portion extending loosely into cavity 8 upon initial application of nut 4. Upon turning the nut, member 12 will be carried loosely around with it, without any binding effect until the nut is within a few turns, say two or three, of its final clamping position. Upon being screwed down to such position, the wide end of member 12 will abut against surface 5, the bottom of inner wall 9 of cavity 8 will then commence to bind on the outer face 13 of member 12, gradually forcing its base inwardly into increasingly tight contact with the threads 3 of bolt 2. As the force increases, due to the movement of the nut, the threads of the bolt will cut or score the inner face of member 12, as indicated at 16, Fig. 6, to a degree. Thereafter, as the nut is screwed home, the member 12 being carried around with it, will shear or plane away the outer edge portion of the threads, with a gradually increasing depth of cut, until the nut 4 is finally screwed down tight. Such effect is indicated at 17, Fig. 4.

In the meantime, such small cuttings or chips, due to the action of member 12 on the threads, will be carried around and will pass between the threads of the bolt and the threads of the nut, some of them finally arriving at clearance cavity 11 for collection and release. Others of the cuttings will become tightly jammed between the threads of the bolt and the nut, increasing the holding action, and when the nut is given the final turn to bring it down tightly into contact with the member 5 being bolted, all of the several parts will be very tightly compressed and brought into close intimate contact, including the cuttings, some of which still remain between the threads.

When all of the parts are thus tightly brought together under the increased turning tension, distorting member 12 will also be very tightly jammed and forced into the lower threads of the bolt with extreme tightness and holding efficiency.

After such application, the distortion of some of the threads of the bolt, and the resulting binding effect, together with the intervening particles of metal and the added binding effect of the member 12, will maintain a very tight holding action against accidental reverse movement of the nut 4. Such reverse movement, however, may be effected by application of a sufficiently powerful wrench, in which case, while the nut 4 may be removed from the bolt for further use, the bolt itself is probably rendered useless for further application, due to the distortion of the threads themselves. However, in view of the very positive resulting effect and action of the locking mechanism itself, which is the main purpose of the invention, the distortion of the bolt becomes secondary.

The invention may be variously changed or modified in dimensions, size and shape of the threads, taper of the distorting member, number and location of the cavities 8 and 11, or in other respects, dependent upon the particular adaptation or use to which the invention is to be put, but all such changes are to be considered as within the scope of the following claims.

What I claim is:

1. A locking nut for bolts provided with an inner longitudinal slot and a tapered distorting member having a rear straight face engaging the outer slot face and a front smooth straight face terminating at one side in a continuous tapered cutting edge for engaging the threads of a bolt, and an additional slot in the nut spaced from said slot for clearance of cuttings.

2. The combination with a threaded bolt, of a standard nut therefor provided at one side with a longitudinal slot parallel with the center of the bolt hole, and a tapered distorting member loosely mounted in said slot and having an inner bearing end portion of greater width than the depth of the slot beyond the threads and an opposite smooth thread engaging face forming a continuous cutting edge at the corner juncture with the side of said member, the nut having a similar slot annularly spaced from said slot for clearance of cuttings first removed in said first named slot.

3. The combination with a threaded bolt, of a standard nut therefor provided at one side with a longitudinal slot parallel with the center of the bolt hole, a distorting member loosely mounted in said slot and having an inner bearing end portion of greater width than the depth of the slot beyond the threads, and having an additional clearance slot for cuttings.

In testimony whereof I hereunto affix my signature.

ELMER W. UTZLER.